United States Patent Office 2,951,775
Patented Sept. 6, 1960

2,951,775
SELECTIVE SACCHARIFICATION OF CELLULOSIC MATERIALS
Alfons Apel, Mannheim-Rheinau, Germany, assignor to UDIC Société Anonyme, Vevey, Switzerland
No Drawing. Filed Dec. 12, 1957, Ser. No. 702,270
Claims priority, application Switzerland Dec. 12, 1956
4 Claims. (Cl. 127—37)

The invention relates to the hydrolysis of cellulosic materials, particularly wood.

In the copending application, Serial No. 540,643, filed October 14, 1955, by Theodor Riehm, a hydrolysis process is disclosed where finely divided cellulosic starting material is first subjected to a prehydrolysis at temperatures of about 15 to 30° C. with an aqueous concentrated hydrochloric acid containing about 29 to 37 percent of HCl by weight, and when the prehydrolyzed material is then treated in the same temperature range with concentrated hydrochloric acid containing at least 40 percent of HCl by weight. The concentration of the hydrochloric acid in the prehydrolysis step depends on the nature of the starting material; for soft wood, concentrations of about 34 to 37 percent and for hardwood concentrations of about 29 to 34 percent of HCl are suitable.

The process described in said application allows of a selective sequential dissolution of the readily and difficultly soluble carbohydrates, which results in obtaining separate solutions of pentoses and hexoses; said solutions are then separately processed for the recovery of pure end products.

In the commercial application of said process, finely comminuted vegetable material, particularly sawdust, is placed in a column and 29 to 37% aqueous HCl is passed upwardly at room temperature through the column, whereby the readily hydrolyzed carbohydrates of the hemicellulose are dissolved; subsequently, said specifically lighter HCl is upwardly displaced by a 40 to 42% HCl, which dissolves the difficultly soluble carbohydrates, particularly those of cellulose. Both solutions are separately collected, and after removal of the hydrochloric acid, the solutions are processed for the recovery of various sugars, for instance: xylose from the first solution, and glucose from the second solution.

I have found that a far better separation of the hemicellulosic hydrolysis products, particularly pentoses, and the cellulosic hydrolysis products, particularly glucose, is obtained when the prehydrolysis with about 29–37% HCl is carried out not in aqueous solution but in a lower aliphatic alcohol having 1 to 3 C atoms.

The alcoholic HCl solution is not only a better solvent for xylose than for glucose but it maintains also better than the aqueous solution the boundary line between the two hydrolysis solutions because of the greater difference of the specific weights. In addition, it has in comparison the specific weights. In addition, it has in comparison with aqueous HCl an increased capillary activity, which increases the rate of diffusion of the hydrolyzed solution and thereby reduces objectionable decomposition reactions and repolymerization of the monomeric sugars. Suitable alcohols are, for instance, methanol, ethanol, n-propyl alcohol, and mixtures thereof.

A further advantage of the use of alcoholic HCl solutions is that the obtained sugar solutions can be processed directly to sugar esters of the respective alcohols.

The following examples illustrate the method of the invention:

Example 1

1.5 kg. of dry beech wood sawdust are placed in a glass tube of 120 mm. inner diameter and 1200 mm. length. The height of the charge is about 1000 mm. A methanolic hydrochloric acid containing 370 g. of HCl in 1 liter (37% by weight=36% by volume of HCl; $d=1.025$) is passed upwardly through the tube at a rate of 7 cm./hour. After 15 hours, the solution starts reaching the head of the tube and can be withdrawn. At that time, 41–42% aqueous HCl ($d=1.21$) is introduced into the bottom of the tube at the same rate of 7 cm./hour so as to displace the methanolic hydrochloric acid.

The methanol-hydrochloric acid-sugar effluent from the top of the hydrolysis tube is continually analyzed for sugar. At the beginning, there is a rather steep rise of the sugar content due to the dissolved hemi-celluloses; after passing through a maximum, the sugar content drops somewhat slower to a very low value at the end of the methanolic phase. After displacement of the methanolic hydrochloric acid by the aqueous highly concentrated hydrochloric acid, which displacement takes place substantially without mixing, the sugar concentration in the aqueous hydrochloric acid rises again abruptly due to the dissolved decomposed cellulose and then drops until the cellulose has been completely extracted.

Both sugar solutions are concentrated by vacuum distillation to syrup consistency, whereby methanol and hydrochloric acid are recovered. The residual acid content in each solution is adjusted to 3 to 3.5%, calculated on the sugar content. After dilution to a sugar content of 10 to 15 percent, both weakly acidic solutions are separately after-hydrolyzed at 120° C., treated with fuller's earth for precipitating colloidal substances, decolorized by a suitable resin, and then any residual acids and salts are completely removed by ion exchangers.

The sugar solution obtained from the prehydrolysis with methanolic hydrochloric acid contained 312 g. of sugar, corresponding to 20.8 percent of the original dry wood substance.

The sugar solution from the main hydrolysis with concentrated aqueous hydrochloric acid contained 624 g. of sugar, corresponding to 41.7 percent of the original dry wood substance.

The composition of the sugar (calculated on the dry material) was as follows:

|  | Prehydrolysis, percent | Main Hydrolysis, percent |
| --- | --- | --- |
| Glucose | 3.1 | 90.5 |
| Polymeric sugars | 2.9 | 3.1 |
| Xylose | 89.7 | 1.6 |
| Other sugars | 4.3 | 4.8 |

The prehydrolysis and main hydrolysis sugar syrups were of high purity with respect to the dominant sugars, xylose and glucose, respectively, which is a necessary condition for obtaining high yields of the crystallized sugars.

Example 2

The same apparatus as described in Example 1 was charged with a mixture of equal parts of hardwood cotton stems, and bagasse, which had been comminuted to an average particle size of .3 to 1.5 mm. and which contained 1.5 kg. of dry N-propanolic hydrochloric acid (35% HCl by volume; $d=1.05$) was passed upwardly through the charge at a rate of 7 cm. per hour, followed after 15 hours at the same rate of flow by aqueous 41–42% HCl ($d=1.21$).

The effluents, processed as described in Example 1, produced a prehydrolysis sugar solution containing 335 g. of sugars and a main hydrolysis sugar solution containing 676.2 g. of sugars.

I claim:

1. In the two-step hydrochloric acid saccharification of a vegetable cellulosic material at temperatures of about 15 to 30° C., the steps of first treating said material with an essentially alcoholic solution of hydrochloric acid of about 29 to 37 percent by weight, the alcohol being an aliphatic alcohol containing 1 to 3 carbon atoms, thereby obtaining as hydrolysis product substantially pentoses dissolved in said solution, displacing said alcoholic pentoses containing hydrochloric acid solution by an aqueous 39 to 42 percent hydrochloric acid solution, and reacting the cellulosic material with said aqueous solution, thereby obtaining an aqueous hydrochloric acid solution of hexoses.

2. The process as claimed in claim 1 comprising passing said alcoholic and said aqueous hydrochloric acid solution as a continuous column, the alcoholic solution forming the upper part of said column, upwardly through a stationary bed of the cellulosic material.

3. The process as claimed in claim 2 comprising collecting separately the alcoholic solution and the aqueous solution after passage through the cellulosic material.

4. The method of claim 1, wherein sawdust is used as vegetable cellulosic material.

References Cited in the file of this patent

UNITED STATES PATENTS

| | | |
|---|---|---|
| 1,759,166 | Farber | Mar. 3, 1931 |
| 1,851,822 | Farber | Mar. 29, 1932 |
| 1,919,623 | Dreyfus | July 23, 1933 |
| 1,963,972 | Dreyfus | June 26, 1934 |
| 2,465,347 | Boehm | Mar. 29, 1949 |
| 2,752,270 | Specht | June 26, 1956 |